United States Patent
Albert et al.

(10) Patent No.: US 11,819,916 B2
(45) Date of Patent: Nov. 21, 2023

(54) DEVICE AND METHOD FOR REPAIRING COMPONENTS BY MEANS OF ADDITIVE MANUFACTURING

(71) Applicant: DMG MORI Ultrasonic Lasertec GmbH, Stipshausen (DE)

(72) Inventors: David Albert, Stöttwang OT Thalhofen (DE); Patrick Diederich, Renningen (DE); Martin Reisacher, Kempten (DE)

(73) Assignee: DMG MORI Ultrasonic Lasertec GmbH, Stipshausen (DE)

( * ) Notice: Subject to any disclaimer, the term of this patent is extended or adjusted under 35 U.S.C. 154(b) by 0 days.

(21) Appl. No.: 17/634,846

(22) PCT Filed: Jul. 28, 2020

(86) PCT No.: PCT/EP2020/071274
§ 371 (c)(1),
(2) Date: Feb. 11, 2022

(87) PCT Pub. No.: WO2021/028216
PCT Pub. Date: Feb. 18, 2021

(65) Prior Publication Data
US 2022/0281004 A1 Sep. 8, 2022

(30) Foreign Application Priority Data
Aug. 14, 2019 (DE) .................... 10 2019 121 947.7

(51) Int. Cl.
*B22F 10/20* (2021.01)
*B22F 10/366* (2021.01)
(Continued)

(52) U.S. Cl.
CPC ............ *B22F 10/20* (2021.01); *B22F 10/366* (2021.01); *B22F 10/85* (2021.01); *B33Y 10/00* (2014.12);
(Continued)

(58) Field of Classification Search
CPC ................................................ B22F 2007/068
See application file for complete search history.

(56) References Cited

U.S. PATENT DOCUMENTS 9,272,369 B2 * 3/2016 Bruck ................ B23K 35/0244
11,117,360 B2 * 9/2021 Revanur ................ B22F 10/366
(Continued)

FOREIGN PATENT DOCUMENTS

| CN | 108340582 A | 7/2018 |
| CN | 108 489 986 A | 9/2018 |

(Continued)

OTHER PUBLICATIONS

Jian Gao et al. "An integrated adaptive repair solution for complex aerospace components through geometry reconstruction" The International Journal of Advanced Manufacturing Technology, Springer, Berlin, DE, vol. 36, No. 11-12, Feb. 3, 2007 (Feb. 3, 2007), pp. 1170-1179 ISSN: 1433-3015, XP019583787.
(Continued)

*Primary Examiner* — Jacob J Cigna
(74) *Attorney, Agent, or Firm* — Procopio, Cory, Hargreaves & Savitch LLP (57) ABSTRACT

The invention relates to a device and a method for repairing components by means of additive manufacturing. The deviation of the surface of the component from a predetermined dimensions within a repair region is determined along a specified tool path. In a subsequent filling cycle, a selective application of a filler along the specified tool path is carried out.

22 Claims, 8 Drawing Sheets

(51) Int. Cl.
*B22F 10/85* (2021.01)
*B22F 7/06* (2006.01)
*B33Y 10/00* (2015.01)
*B33Y 30/00* (2015.01)
*B33Y 50/02* (2015.01)
*G05B 19/23* (2006.01)
*G05B 19/4099* (2006.01)
*G05B 19/42* (2006.01)

(52) U.S. Cl.
CPC ............ *B33Y 30/00* (2014.12); *B33Y 50/02* (2014.12); *G05B 19/23* (2013.01); *G05B 19/4099* (2013.01); *G05B 19/4207* (2013.01); *B22F 2007/068* (2013.01)

(56) References Cited

U.S. PATENT DOCUMENTS

| 2016/0159011 A1* | 6/2016 | Marchione | B29C 64/386 |
| | | | 700/98 |
| 2016/0318129 A1* | 11/2016 | Hu | B29C 64/182 |
| 2017/0014910 A1* | 1/2017 | Ng | B22F 10/00 |
| 2017/0370221 A1 | 12/2017 | Bunker | |
| 2018/0141123 A1 | 5/2018 | Revanur | |

FOREIGN PATENT DOCUMENTS

| CN | 109676135 A | 4/2019 |
| EP | 3482853 A1 | 5/2019 |
| WO | 2014/106753 A1 | 7/2014 |
| WO | 2018154658 A | 8/2018 |
| WO | 2019/029968 A1 | 2/2019 |

OTHER PUBLICATIONS

Patent Cooperation Treaty, International Search Report, Application No. PCT/EP2020/071274, dated Oct. 26, 2020, in 6 pages.
German Patent and Trademark Office, Request for Examination, Application No. 10 2019 121 947.7, dated Mar. 23, 2020, in 10 pages.
Chinese Patent Office, Chinese Office Action, Application No. 2022-509037, dated Mar. 29, 2022, in 5 pages.
European Patent Office, Office Action, Application No. 20 753 299.5, dated Sep. 12, 2023, in 21 pages.

* cited by examiner

DEVICE AND METHOD FOR REPAIRING COMPONENTS BY MEANS OF ADDITIVE MANUFACTURING

The present invention relates to a device and a method for repairing components by means of additive manufacturing and in particular for repairing indentations in components.

BACKGROUND OF THE INVENTION

For the repair of damage to components, the repair site is usually milled out in a first step. In a further step, the milled-out portion is scanned and a corresponding computer model is created. Based on these data, a structural model is created, which can be inserted into the milled-out portion to repair the damaged area. Such a repair process makes it possible to repair a damaged area on the surface of a component so that the original surface can be restored. The structure to be inserted can be produced using additive manufacturing processes and can be incorporated into the milled-out portion.

A repair method is known, for example, from US 2017/0370221 A1. In this method, the first step is to remove the defect from a component to be repaired. A repaired component can be created via an additive manufacturing method, so that the component can retain the original geometry. However, known methods have the disadvantage that a plurality of data conversion steps and processing steps of the measurement data are necessary in order to create a structure which can then be manufactured using the additive manufacturing method from the measurement data of the component to be repaired. This means that the data usually needs to be processed. This results in high computing effort and high data amount.

Based on the prior art mentioned above, it is an object of the present invention to solve the problems described. In particular, it is an object to provide an efficient method for repairing components using additive manufacturing and a corresponding device.

DESCRIPTION OF THE INVENTION

To achieve the above objects of the present invention, the features of the independent claims are proposed and preferred developments are in the dependent claims.

According to the present invention, a method for automated repair of components using an additive manufacturing system may comprise a first step in which the defective component is clamped into the manufacturing system. In a further step, a repair area may be defined which includes the surface of the component to be repaired. A tool path may also be set within the repair area. The tool path corresponds to the travel path that the tool of the manufacturing system travels in one cycle. In a further step, the condition of the component in the repair area may be determined (=measuring cycle). In such a measurement cycle, data values may be determined along the set tool path. The data values correspond to the deviation of the surface of the component from a specified allowance. In particular, the determined deviation may be the depth (or the absolute value thereof) of the damaged area at a point (measuring point). In a further step, a selective application of filler or filling material may be carried out. The filler may be applied along the set tool path in at least one filling cycle. In a filling cycle, part or preferably the entire tool path may be travelled and the manufacturing system may be selectively activated for applying the filler depending on the difference between the data value on the path and a predetermined threshold value. This advantageous method makes it possible to use the data that result directly from the measurement cycle as direct input for the filling cycle. Thus, a data array with measured values for various path points (measuring points) is created in the measuring cycle. This data array is in turn the input for the filling cycle and, after a comparison with a predetermined threshold value, determines the activation or deactivation of the manufacturing system for applying the filler.

In other words, in the filling cycle, the manufacturing system travels the set tool path along the path points. A data value, which may have been determined for each of the path points, is compared with the threshold value. When a path point is reached, the tool head, for example a laser, of the additive manufacturing system is activated and a material may be applied. When the next path point is reached, again a comparison is carried out to determine whether the tool head is deactivated or whether it remains activated. It is thus advantageously possible to create the program for the filling cycle directly in the measuring cycle so that further data conversion is not necessary and the data values are used directly for activating or deactivating the tool of the manufacturing system. Because the tool path may be identical both in the measuring cycle and in the filling cycle, the computing effort and the data amount can be further reduced. In addition, the measuring cycle and the filling cycle can be carried out automatically so that a substantially automatic repair of the component is made possible. Elaborate and error-prone data conversions of point clouds of measured values, which may result from measuring the damaged area of the component, are not necessary. A simplified method for repairing components by means of additive manufacturing which at the same time has a lower susceptibility to faults is thus achieved in a particularly advantageous manner.

The tool path may include a large number of path points. In the measurement cycle, a deviation in a tool direction (e.g., a Z direction) between the surface of the component and a desired shape may be determined at each of the path points. The tool direction may be, for example, the direction orthogonal to the component surface in the repair area.

Advantageously, the data values may indicate the deviation of the component surface in the tool direction and the tool direction may be orthogonal to the workpiece surface (e.g., an XY plane) on which the tool path lies. The tool of the additive manufacturing system, such as a laser, is thus moved on the workpiece surface along the tool path. This tool path or the workpiece surface may, for example, be orthogonal to the tool direction which determines the deviation.

In a filling cycle, the filler may be selectively deposited along a path segment of the set tool path. The filler may thus be applied during the travel from one path point to the adjacent path point. Whether the tool of the manufacturing system for applying the filler is switched off is determined at the target path point as a function of the difference between the data value at the target path point and the predetermined threshold. For example, if the tool travels along the tool path from one path point to the next and the threshold value is always exceeded, the laser may be continuously activated, for example, so that the filler is always applied. Powder cladding may, for example, be considered as additive manufacturing. If a path point at which the data value is less than the threshold value is reached during the travel, the laser or the tool head may be switched off. Only when a further path point at which the associated data value again exceeds the threshold value is reached, the laser is activated again.

A path segment may be delimited by two path points and the path segment may preferably extend in a straight line. A further simplification of the repair method may be achieved via this particularly efficient and simple configuration of the path segments, together forming the tool path, in particular since curved segments are avoided and only travel in X direction and in Y direction is necessary. The data values may preferably also be mean values of path points of a segment. The tool may thus also be activated segment by segment.

The threshold may be constant over a filling cycle. In a filling cycle, the tool of the manufacturing system may thus travel the entire repair area along the specified tool path, with each of the data points being compared with the threshold value of the filling cycle. After the completion of the filling cycle, another filling cycle with a modified threshold value may be scheduled. This configuration of the filling cycles makes it possible to successively repair the defects. A plane orthogonal to the tool direction is thus defined in each filling cycle. Each of these planes in turn has a different threshold value until finally a minimum threshold value is present for the last plane so that a final surface (e.g. a flat surface) of the component can be achieved in the repair area. Particularly advantageously, an additional oversize may be applied after the minimum threshold value has been reached. For example, after the minimum threshold value has been reached, filler may be applied to the entire repair area in one (or more) additional filling cycle(s).

A plurality of filling cycles may be performed and the threshold value may be adjusted by one thickness value each time until there is a substantially uniform surface in the repair area. In the repair area, the original surface shape (e.g., linear or curved) of the component may be restored. The thickness value may depend, for example, on a height of the material applied in the filling cycle.

The result of the measuring cycle may be an array of the determined data values. The threshold value may be set for the first filling cycle based on a maximum or minimum (extreme) value of the array and a constant. In particular, the maximum value of the array is used to find the deepest defect of the repair area. Depending on this deepest point, the threshold value may be set such that only the deepest damaged areas are filled in the first filling cycle. In the subsequent filling cycle, a reduced threshold value is used in turn so that additional areas can be filled with filling material. By successively stringing together the filling cycles, the damaged areas are completely filled up.

The threshold value may be reduced by a thickness value in a further filling cycle, the thickness value corresponding to the height of the applied filler in a filling cycle, in particular at a path point or path segment. Such a height is, for example, the height of the weld seam.

The determined data values of the measuring cycle may be used directly for the filling cycle. It is therefore not necessary to convert or transform or digitize the results of the measurement cycle. A particularly efficient and simple repair method may thus be provided. In addition, frequent errors, which usually arise due to conversion errors, are avoided.

Data values may be used (without data conversion) to compare with the threshold value in the filling cycle. Thus, the unconverted data values from the measuring cycle are used directly to decide whether to activate or deactivate the tool of the adaptive manufacturing system (i.e., whether to insert material) by comparison with the threshold value at the respective path points.

The method may thus advantageously be a method for creating a planar and/or curved surface in a repair area. Advantageously, the repaired surface shape corresponds to an original surface shape of the component.

Advantageously, the tool path may be defined taking into account a working diameter of the manufacturing system. Such a working diameter of the adaptive manufacturing system may be, for example, the diameter of the laser (in the case of powder cladding). Taking this working diameter into account, the tool path may advantageously be defined such that the entire repair area can be completely covered.

The tool path may be a non-overlapping, continuous polyline. More preferably, the tool path may be meandering. The tool path may also consist of line segments, each of which extends in a straight line. A particularly error-free method may thus be provided with an optimized tool path. In addition, the tool path may be configured to be parallel to the contour of the repair area.

The repair area may be specified such that the area of the component to be repaired can be completely covered. Thus, it may be achieved that the method can produce a planar surface (or advantageously also a curved surface according to the original component shape) at the repair site.

In a final filling cycle, the tool of the additive manufacturing system may advantageously be continuously activated when travelling the set tool path. This procedure makes it possible to even out any unevenness that may remain. In addition, an oversize may be provided over the entire area of the repair area.

The defined tool path is advantageously both the travel path of the tool of the additive manufacturing system and the travel path of the measuring instrument for determining the deviation. It is therefore not necessary to convert the travel path or the tool path between the measuring cycle and the filling cycle or all filling cycles. The computing effort can thus be further reduced and the susceptibility to errors can be reduced to a minimum.

The tool of the additive manufacturing system may be moved along the set tool path from one path point to an adjacent path point, wherein the determined data value of the respective path point may be compared with a threshold value at each path point and the tool may be activated when the threshold value is exceeded. On the other hand, when the value falls below the threshold value, the tool may be deactivated (or vice versa, when the sign is reversed). Advantageously, it is therefore possible to use the measured values at the path points to directly provide a command array which activates or deactivates the laser or the tool of the additive manufacturing system.

Particularly advantageously, the measurement cycle and the subsequent filling cycle are carried out automatically and manual intervention is therefore not required. The measurement cycle and all subsequent filling cycles are also advantageously carried out automatically. The data values are thus the same for all filling cycles. Alternatively, a further measurement cycle may advantageously be provided after the individual filling cycles, for improved accuracy.

The method may be a method for filling indentations of a component surface in a damaged area.

The method may advantageously comprise the step of moving the tool along path points of the set tool path, activating a laser upon reaching a path point where the data value is greater than the threshold value and deactivating the laser upon reaching a path point where the data value is not greater than the threshold. A large number of filling cycles may be provided, in which case the threshold value may be reduced from filling cycle to filling cycle. Advantageously, the threshold for the final filling cycle is reduced such that all data values of any data point are greater than the threshold value. Particularly advantageously, the threshold value may be set such that a plurality of oversize layers are applied in the repair area.

Advantageously, the set tool path may comprise parallel segments and the distance between adjacent segments may be defined depending on the working diameter of the laser.

The additive manufacturing system may comprise a laser, the laser being switched on and off at path points depending on the result of the comparison between the data value at the path point and the threshold value.

Advantageously, a measuring probe or an optical sensor may be used for the measuring cycle (for determining the data values). In addition, a capacitive and/or inductive sensor may be used for the determination.

Advantageously, a device for data processing may be provided for carrying out the above-mentioned method. In addition, a computer-readable storage medium may be provided which comprises instructions which, when executed by a computer, cause the computer to carry out the above-mentioned method. An additive manufacturing system may be provided which is configured to carry out the above-mentioned method and includes a corresponding computing unit for this purpose.

The invention is described below using examples with reference to the attached figures

DETAILED DESCRIPTION

The following features of the exemplary embodiments can be combined in whole or in part and the present invention is in no way limited to the exemplary embodiments described. In the drawings, the same or similar features are designated with the same reference symbols.

The present invention relates to an optimized method for automated repair of components which show damage, for example. Such damage may be bulges, scratches, grooves, etc. In order to repair the indentation in the component, a method is proposed in which the computational effort can be reduced to a minimum. The data processing can thus be reduced to a minimum while the conversion errors that usually occur frequently can be avoided. Additional processing of the measurement data in order to create a model (e.g., CAD model) that can be used for the repair is not necessary since, according to the present invention, the data from the measurement cycle is used directly as input for a filling cycle. In such a filling cycle, material is applied to the component in layers using additive manufacturing. The present invention may be used particularly advantageously for additive manufacturing methods that work based on laser.

Figure 1:
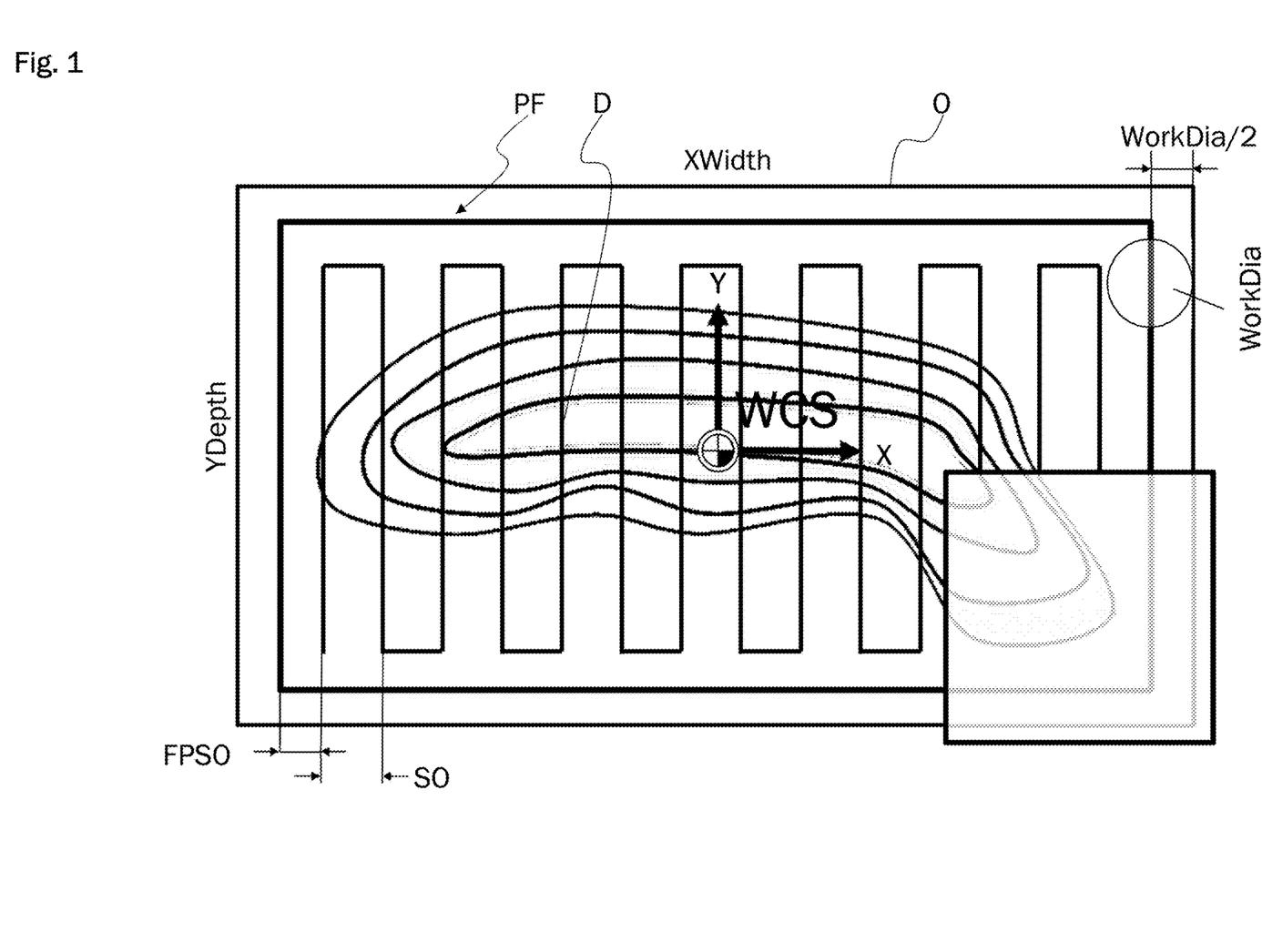
FIG. 1: shows an overview of a surface to be repaired with a marked tool path PF.

A first view of a repair area O is shown in FIG. 1. The repair area O completely covers the surface of the metallic component to be repaired, with the edge of the specified repair area O being at a minimum distance from the surface to be repaired. As shown in FIG. 1, the damage D to be repaired on the component is an indentation. This indentation is completely filled using the method according to the invention so that the component has a planar surface at the end of the method.

An exemplary tool path PF is shown in FIG. 1. The tool path PF defines the path that the tool of the manufacturing system travels in one cycle. However, the tool path PF is not limited to the straight-line configuration shown in FIG. 1, but could also include curved segments. Advantageously, however, the tool path PF includes only linear sections so that the computing effort can be further reduced. The tool path PF may advantageously also be defined as a function of the working diameter (WorkDia). For example, as shown in FIG. 1, the diameter of the manufacturing system is a diameter of the laser. Depending on the diameter of this laser, the distance between adjacent segments of the tool path PF is determined. Particularly advantageously, the distance between two adjacent line segments of the tool path PF corresponds to at least half the working diameter plus 5%. Very reliable repair results were found for this particularly advantageous distance.

The tool path shown in FIG. 1 includes, for example, a rectangular outer tool path PF and a meandering inner tool path PF wherein the starting point and the end point are arranged opposite one another. The tool path may be a continuous tool path or may advantageously also be divided into a number of spaced tool paths. Advantageously, line segments of the tool path PF do not overlap. The tool path PF is set such that the entire area in the repair area O is covered taking into account the working diameter. The tool path PF remains unchanged both in the measuring cycle and in the filling cycle, additionally reducing the calculation effort and data amount. The view shown in FIG. 1 shows the XY plane as an example, which is a flat plane here. The deviations of the surface of the component from a specified allowance, simultaneously forming the data values DW, are measured in the tool direction (for example a Z direction). The tool direction is, for example, the direction in which the tool of the manufacturing system applies the filler.

Particularly advantageously, the tool path PF may also be an uninterrupted course of a line which extends continuously from a starting point to an end point and (always) comprises straight line segments which preferably do not overlap. In such a case, the array generated in the measurement cycle can also be used directly for the filling cycle, in correspondence to the path points. In an embodiment, curved line segments may be used. For example, a polyline may be used as a line segment.

Figure 2:
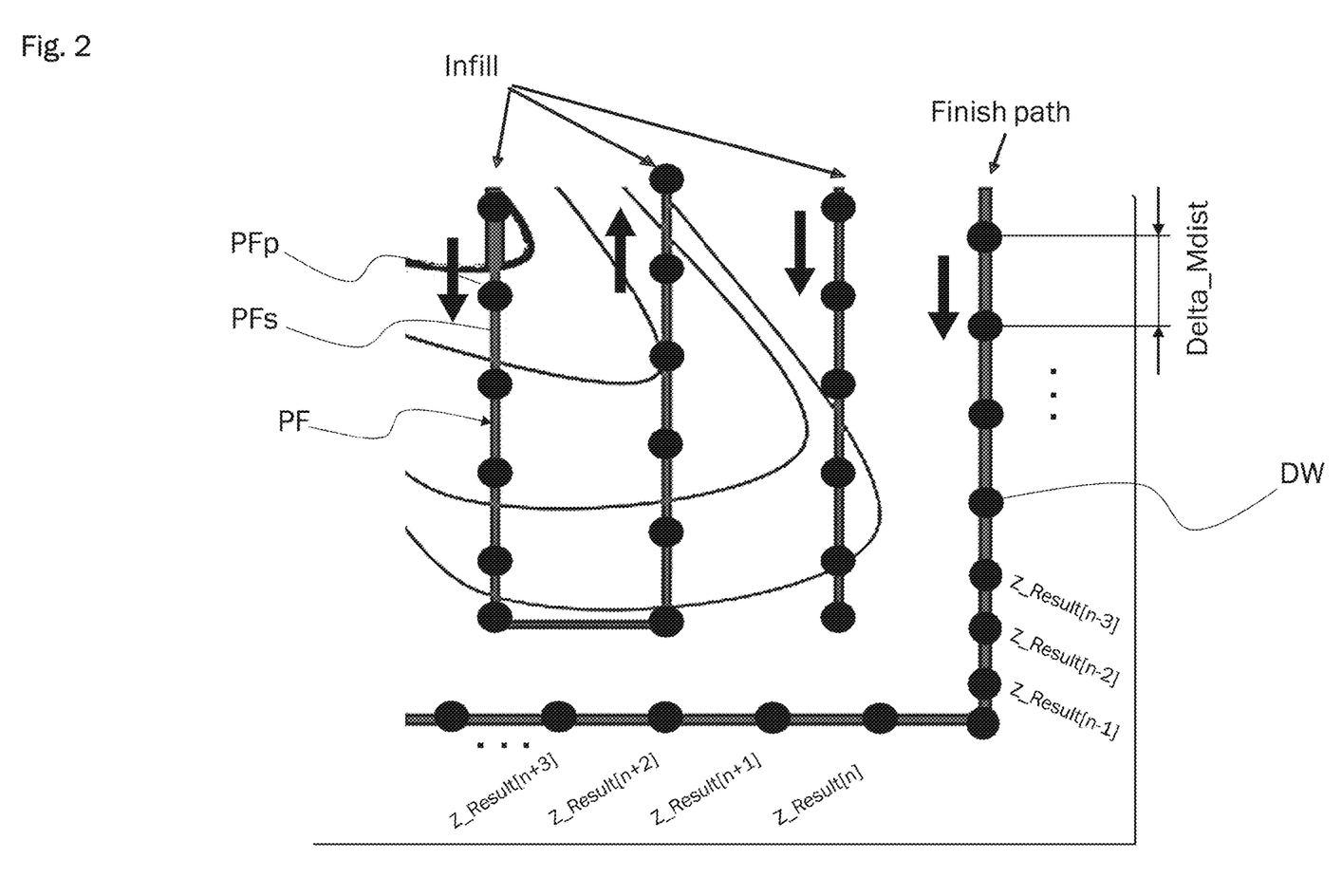
FIG. 2: shows a detailed view of the tool path PF.

A detailed view of the repair area O is shown in FIG. 2. Here, the tool path PF is formed by path points PFp. These path points are stringed together with the path segments PFs between them. In this example, these path segments PFs are straight line segments. The distance between adjacent path points PFp may vary along the tool path so that optimal path points PFp are provided. In particular, however, the path points PFp may be distributed uniformly over the entire tool path PF, with at least one path point PFp additionally being provided in each corner of the tool path PF, as is also shown in FIG. 2. In such a corner point, for example, there may be a change in direction of the tool path PF.

In addition, arrows are shown in FIG. 2 which indicate the direction along which the tool of the manufacturing system, in particular the laser, is moved along the tool path PF. The tool path PF, which is directly above the damaged area, is preferably a single uninterrupted tool path which is traversed once along a direction in a cycle. For example, a tool path may be interrupted when the tool needs to be taken off or retracted (e.g., along the tool direction) such that filler application is not possible. In an advantageous further embodiment, the tool path is configured in such a way that, in a filling cycle, only segments in which the filler is to be applied are approached. In such an embodiment, the tool path in the filling cycle may differ from the tool path in the measuring cycle. In addition, the tool path may differ from filling cycle to filling cycle.

As shown in FIG. 2, data values DW which are determined for each of the path points PFp are provided.

The first step in the method of repairing components using additive manufacturing is to clamp the component to be repaired in the manufacturing system. Once the component is in the manufacturing system, a repair area may be defined that covers all (or just a portion) of the component surface to be repaired. The tool path PF may then be defined within this repair area. All these steps may be viewed as an initialization process.

After the initialization, a measuring cycle and a plurality of filling cycles may follow, preferably fully automatically. In a measuring cycle, the manufacturing system may automatically determine the depth values in the Z direction (or generally in the tool direction) at all path points PFp of the tool path PF. This is illustrated in FIG. 2 with the designation Z_result[n]. The data values are thus, for example, the measured values in the Z direction (or generally in the tool direction) at the path points PFp. In a particularly advantageous embodiment, these measured values are stored sequentially in a data array. The data array may thus be viewed as an ordered arrangement of measured depth values. The depth values may be measured with respect to a predefined zero plane which corresponds, for example, to an ideal surface depth of the component.

Figure 3A:
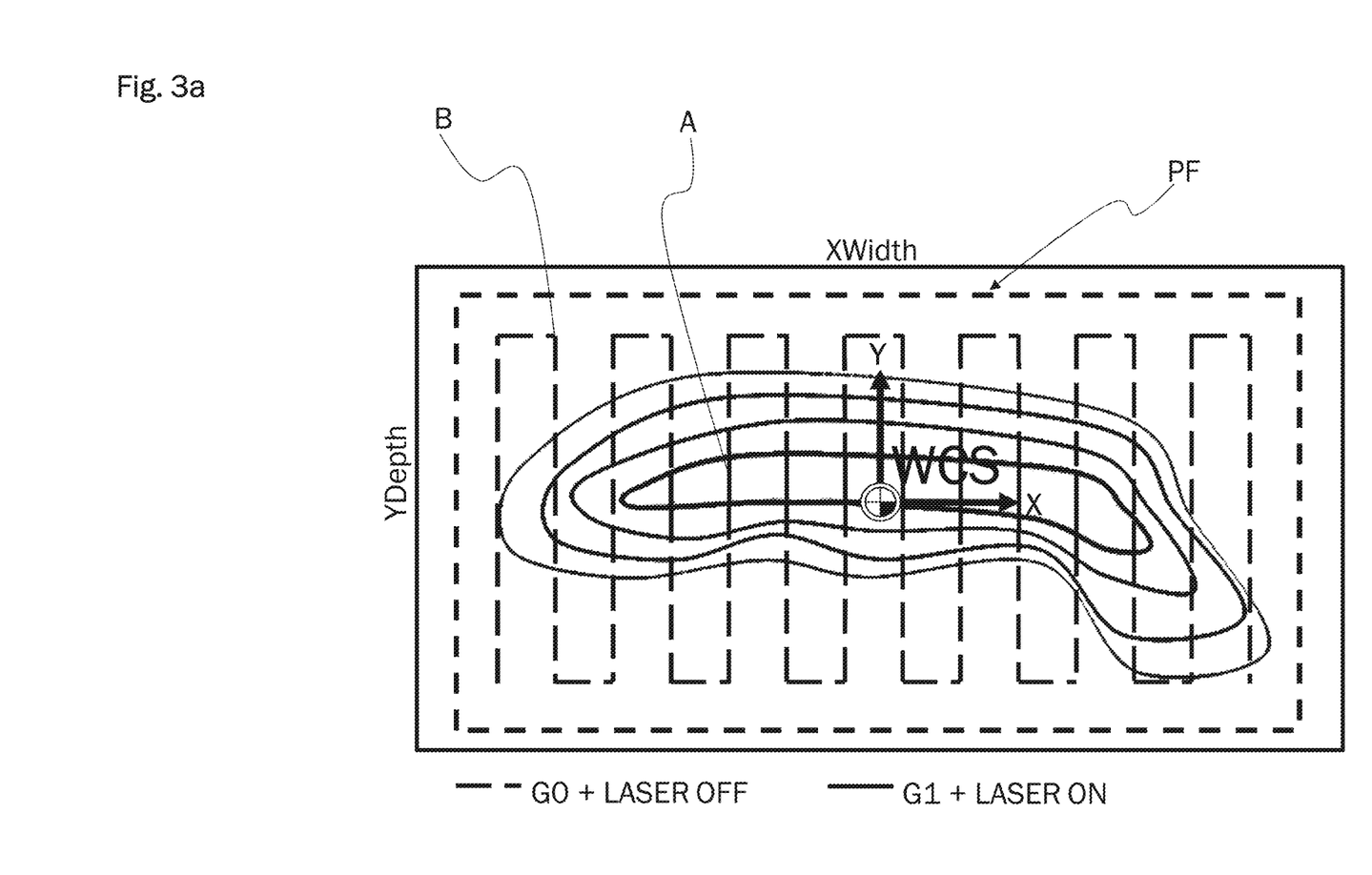
FIG. 3a: shows a first view in a filling cycle.

After the data values have been determined and a data array has been created, the first filling cycle may follow directly, in which the damaged area of the component in the repair area O is selectively filled by using an additive laser. Such filling cycles are shown in FIGS. 3a to 3e. In an exemplary first filling cycle, as shown in FIG. 3a, the tool of the additive manufacturing system travels the entire tool path PF. For each path point PFp that is reached, the respective data value is compared with the threshold value. The threshold value is set as a function of the determined depth of the damaged area. In the first filling cycle, as shown in FIG. 3a, the maximum value in the data array is determined and the maximum value (or preferably a slightly lower value, by around 1%) is adopted as the threshold value. As a result, in the first filling cycle, only the damage area having maximum depth is filled. Any areas where the damage is less deep will not be filled with filler in the first filling cycle. This is also shown in FIG. 3a, in which the activated laser A is shown as a solid line along the tool path PF. In portions of the tool path where the threshold is not met or exceeded, the laser is deactivated B, shown by the dashed line in FIG. 3a. In FIG. 3a, only the innermost region of the damaged area is therefore filled with filling material.

Figure 3B:
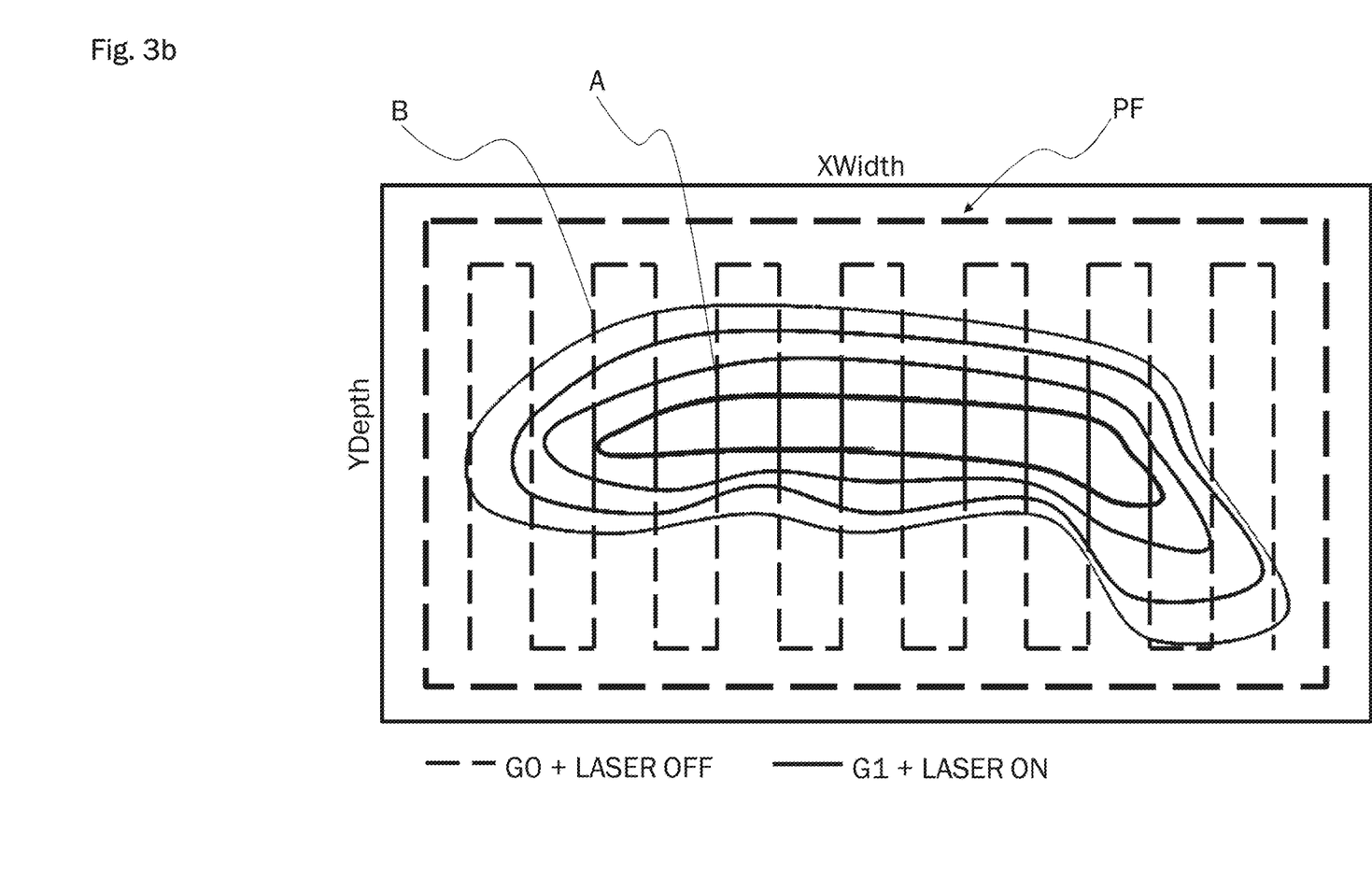
FIG. 3b: shows a further view in a filling cycle.

In the subsequent filling cycle, as shown in FIG. 3b, the threshold value is modified. In particular, the threshold value is reduced, for example by the filling level (for example the calculated weld seam thickness) as applied in the first filling cycle. Thus, since the threshold value has been further reduced, filler hast to be applied to a larger region of the damaged area in the filling cycle illustrated in FIG. 3. The laser is activated A both in the area of the laser processing area determined in the first filling cycle and in the additional area extending beyond where the respective data value of the path points exceeds the threshold value.

Figure 3C:
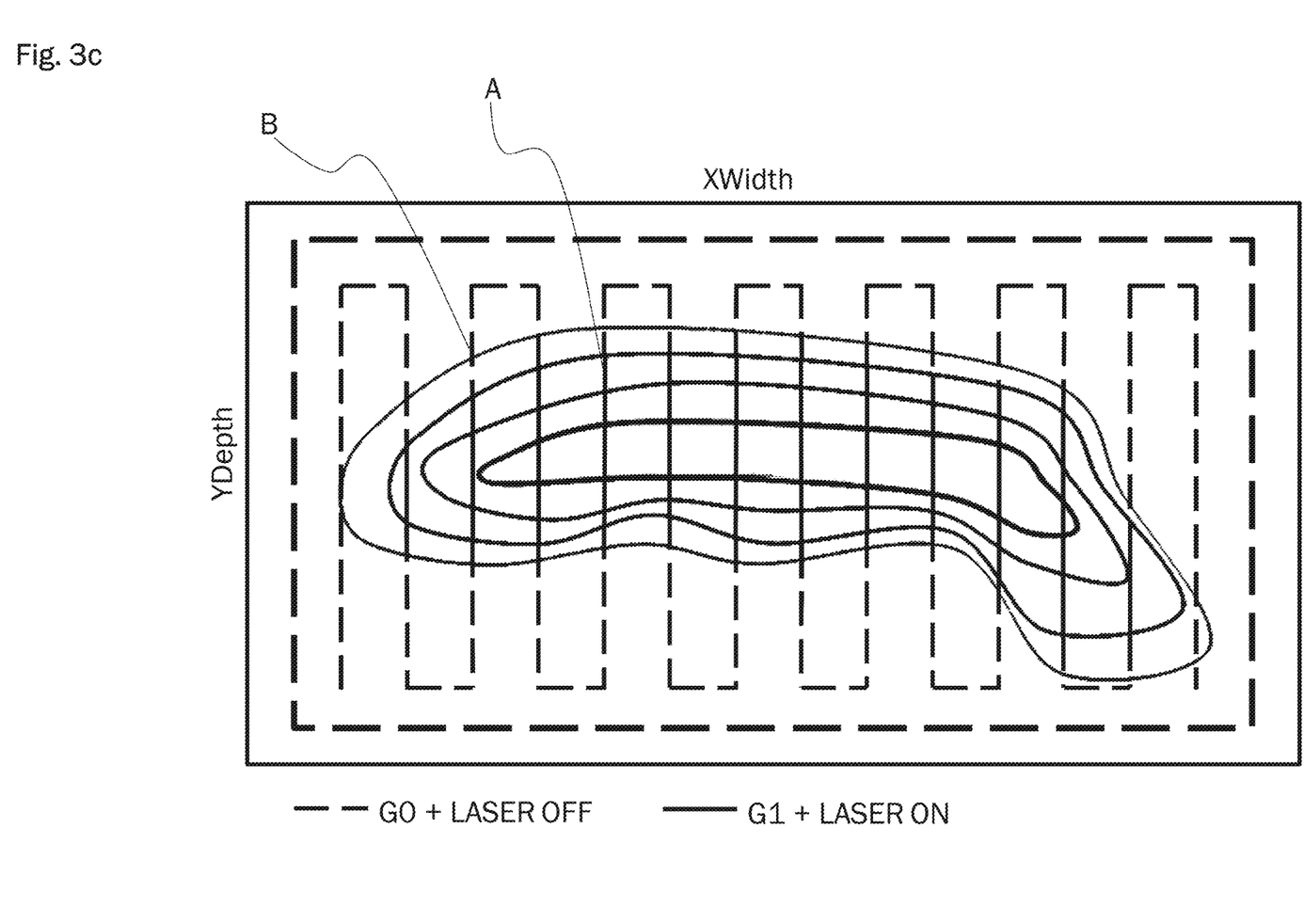
FIG. 3c shows another view of the tool path in the filling cycle.
Figure 3D:
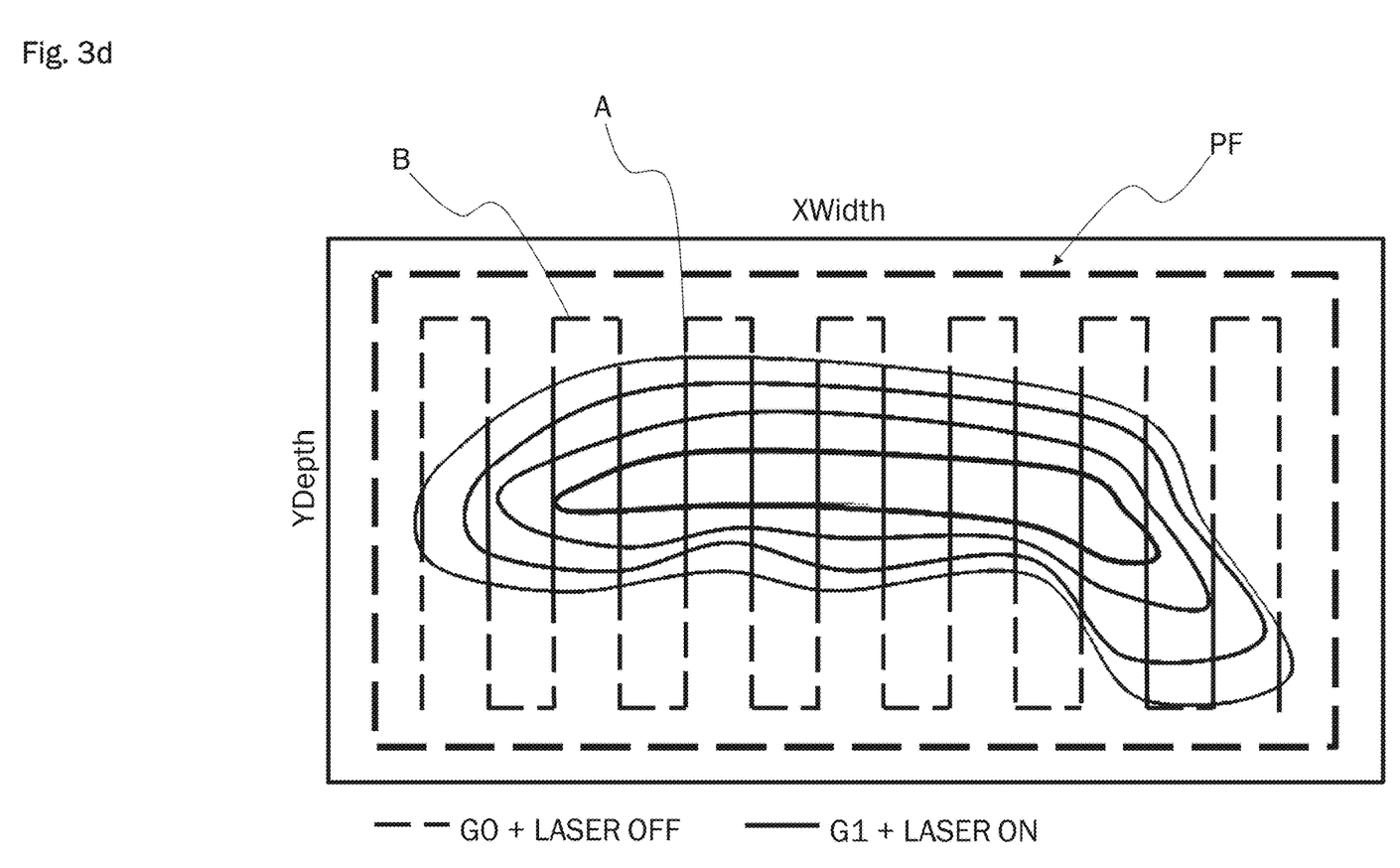
FIG. 3d: shows a view of a well advanced filling cycle.

Analogously, in FIGS. 3c and 3d, the filling area is increased and the laser is activated A in areas that become larger in each case.

Figure 3E:
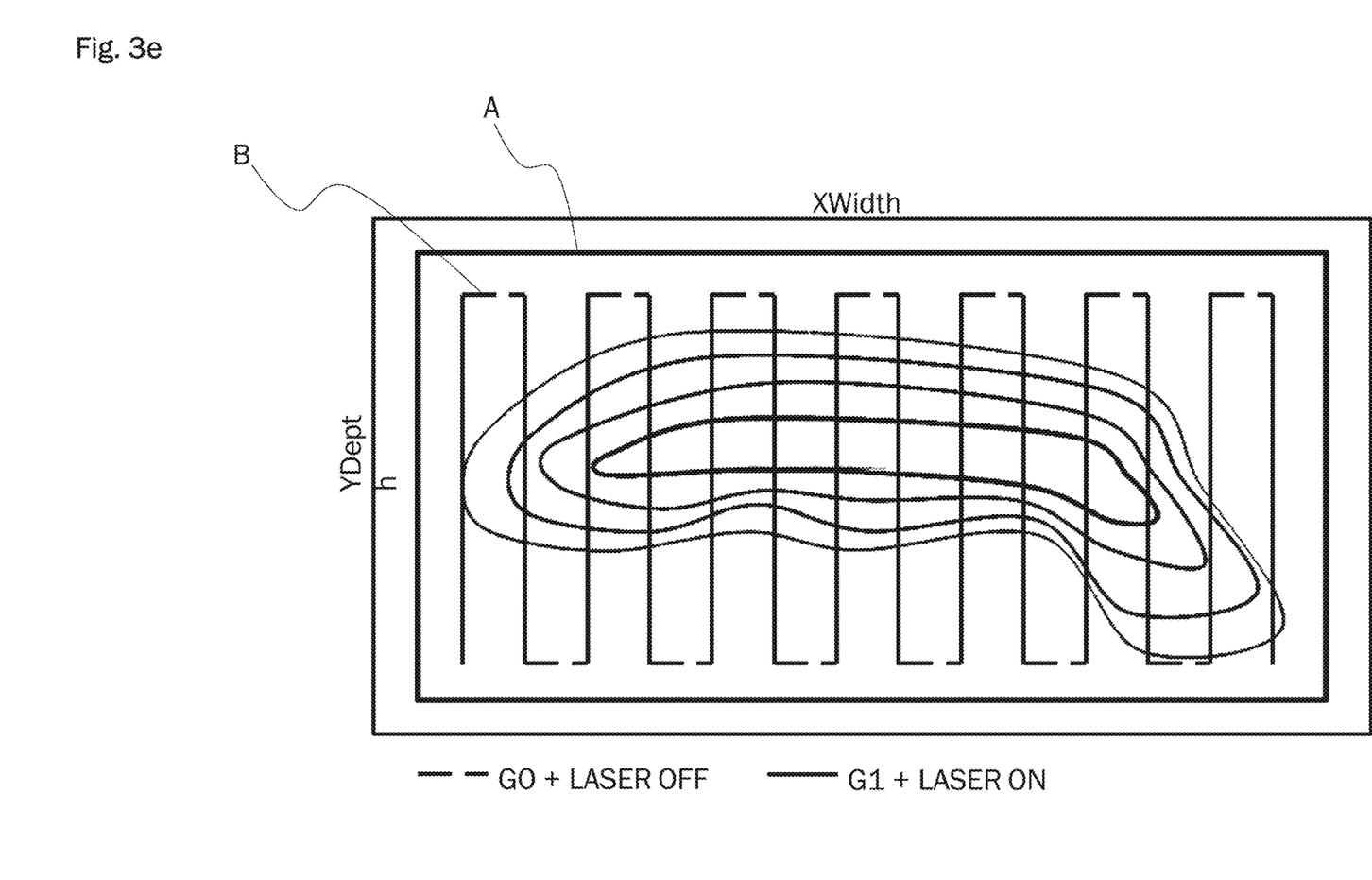
FIG. 3e: shows a final filling cycle.

FIG. 3e shows a final filling cycle, for example, in which the laser is substantially continuously activated A. The laser is deactivated B only in the horizontal portions between two adjacent line segments of the meandering tool path PF in order to further increase the surface quality.

Figure 4:
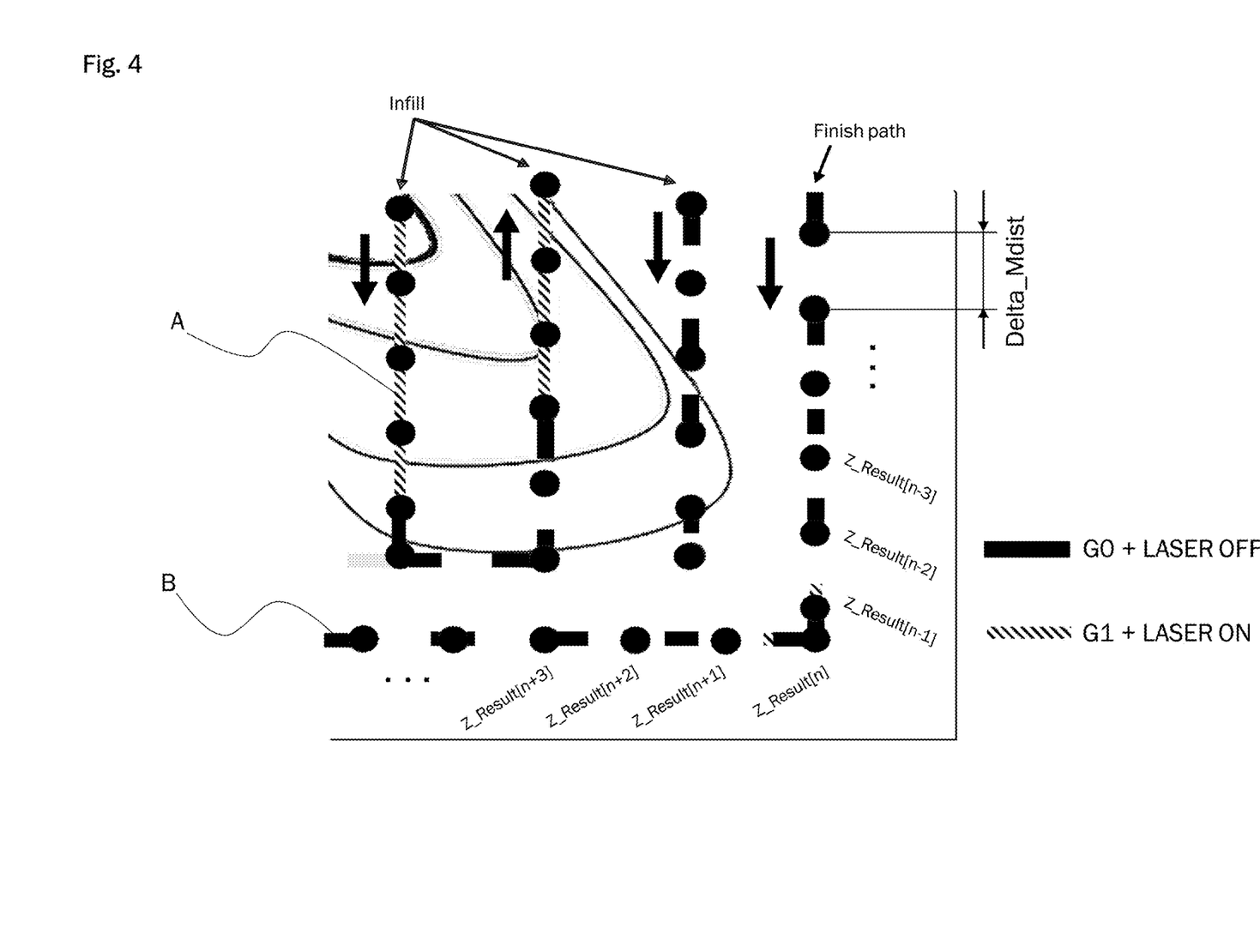
FIG. 4: shows a detailed view of the tool path in the filling cycle.

FIG. 4 shows a detailed view of a filling cycle. The laser is activated A between two adjacent path points PFp when a path point PFp exceeding the threshold value is reached in the travel direction of the laser. Only when a path point PFp is reached at which the date value is less than the threshold value again, the laser is deactivated B. For all path points for which the data value is less than the threshold value, the laser remains deactivated or is deactivated if it was activated before. The activation and deactivation of the laser as a function of the measured data value exceeding a threshold value is described in the present exemplary embodiment. However, it is also possible to reverse the signs. In other words, the measured values in the tool direction can be taken as negative values. In such a configuration, the laser is then activated when the data value falls below the threshold value. However, the above description of activating the laser when the data value exceeds a threshold relates exemplarily to the absolute value of the measured depth in the repair area.

The component surface to be repaired may also be curved (even three-dimensionally curved) in the original form. The originally curved surface may thus be restored in the repair area by the method according to the invention. The measuring direction preferably corresponds to the tool direction and may preferably be arranged orthogonally to the surface of the component in the measuring cycle so that a desired depth of the damaged area can be determined. The tool path may also preferably be in a surface parallel to the original (i.e., intact) surface of the component. The absolute direction of the measurement may thus change from measurement point to measurement point, for example when measuring along a curved surface. This depth may be refilled accordingly in the filling cycle. The application layers of the tool in the filling cycle are preferably applied in tool direction.

The invention claimed is:

1. A method for automated repair of components with an additive manufacturing system, said method comprising following steps:
   a) specifying a repair area including a surface to be repaired of a component and setting a tool path within said repair area;
   b) determining a condition of the component in said repair area in a measuring cycle by determining data values along the set tool path for a deviation of the surface of the component from a specified allowance; and
   c) selectively applying a filler along the set tool path in at least one filling cycle,
   wherein a part or all of the tool path is travelled in a filling cycle and the manufacturing system for applying the filler is activated selectively depending on a difference between the data values and a predeterminable threshold value, wherein the tool path corresponds to a travel path travelled by a tool of the manufacturing system in the at least one filling cycle, wherein the tool of the additive manufacturing system is moved along the set tool path from a path point to an adjacent path point and, at each path point, a comparison of the determined data value of a respective path point and the threshold value is carried out, and the tool is activated when the threshold value is exceeded.

2. The method according to claim 1, wherein the tool path includes a plurality of path points, and wherein, in step b), a deviation at each of the path points in a tool direction between the surface of the component and a desired shape is determined.

3. The method according to claim 1, wherein the data value indicate the deviation of the surface of the component in a tool direction, and wherein the tool direction is orthogonal to a selected surface in which the tool path lies.

4. The method according to claim 1, wherein the threshold value is constant in the filling cycle.

5. The method according to claim 1, wherein a plurality of filling cycles are carried out and the threshold value is adjusted by a thickness value each time until a final surface is present in the repair area which corresponds to a target surface.

6. The method according to claim 1, wherein a result of step b) is an array consisting of the determined data values and the threshold value for the filling cycle is set based on a maximum value or minimum value of the array and/or a constant.

7. The method according to claim 1, wherein the threshold value is adjusted by a thickness value in a further filling cycle, and wherein the thickness value corresponds to a height of the filler applied in the further filling cycle.

8. The method according to claim 1, wherein the determined data values of the measuring cycle are used directly for the filling cycle.

9. The method according to claim 1, wherein the determined data values are used for comparison with the threshold value in the filling cycle without data conversion.

10. The method according to claim 1, wherein the tool path is defined taking into account a working diameter of a manufacturing process, including a diameter of a laser, and covers an entire repair area.

11. The method according to claim 1, wherein the tool path is a non-overlapping continuous polyline configured in a meandering shape.

12. The method according to claim 1, wherein the set tool path is the travel path of the tool of the additive manufacturing system and the travel path of a measuring instrument for determining the deviation.

13. The method according to claim 1, wherein at least steps b) and c) are configured to be carried out fully automatically.

14. The method according to claim 1, wherein step c) comprises:

moving the tool along path points of the set tool path, wherein, upon reaching a path point where the data value is greater than the threshold value, a laser is activated and, upon reaching a path point where the data value is not greater than the threshold value, the laser is deactivated, and wherein the filling cycle is followed by a further filling cycle in which the threshold value is reduced.

15. The method according to claim 1, wherein the set tool path comprises parallel segments and a distance between adjacent segments is defined depending on a working diameter of a laser.

16. The method according to claim 1, wherein the additive manufacturing system comprises a laser and step c) comprises:

switching the laser on and off at path points depending on a result of a comparison between the data value at the path point and the threshold value.

17. The method according to claim 1, wherein a measuring probe, an optical sensor, a capacitive sensor, or an inductive sensor determines the deviation.

18. The method according to claim 1, wherein the filler is selectively applied along a path segment of the set tool path in the filling cycle when the determined data value for the path segment or a path point of the specified tool path is greater than or equal to another threshold value.

19. The method according to claim 18, wherein a path segment is delimited by two path points and the path segment extends in a straight line.

20. An additive manufacturing system, comprising:

a device for data processing configured to carry out a method comprising:

specifying a repair area including a surface to be repaired of a component and setting a tool path within said repair area;

determining a condition of the component in said repair area in a measuring cycle by determining data values along the set tool path for a deviation of the surface of the component from a specified allowance; and selectively applying a filler along the set tool path in at least one filling cycle, wherein a part or all of the tool path is travelled in a filling cycle and the manufacturing system for applying the filler is activated selectively depending on a difference between the data values and a predeterminable threshold value, wherein the tool path corresponds to a travel path travelled by a tool of the manufacturing system in the at least one filling cycle, and wherein the tool of the additive manufacturing system is moved along the set tool path from a path point to an adjacent path point and, at each path point, a comparison of the determined data value of a respective path point and the threshold value is carried out, and the tool is activated when the threshold value is exceeded.

21. The additive manufacturing system according to claim 20, wherein the additive manufacturing system is configured for repairing components by powder cladding.

22. A computer-readable storage medium comprising instructions which, when executed by a computer, cause it to carry out:

specifying a repair area including a surface to be repaired of a component and setting a tool path within said repair area;

determining a condition of the component in said repair area in a measuring cycle by determining data values along the set tool path for a deviation of the surface of the component from a specified allowance; and selectively applying a filler along the set tool path in at least one filling cycle, wherein a part or all of the tool path is travelled in a filling cycle and in manufacturing system for applying the filler is activated selectively depending on a difference between the data values and a predeterminable threshold value, wherein the tool path corresponds to a travel path travelled by a tool of the manufacturing system in the at least one filling cycle, wherein the tool is moved along the set tool path from a path point to an adjacent path point and, at each path point, a comparison of the determined data value of a respective path point and the threshold value is carried out, and the tool is activated when the threshold value is exceeded.

\* \* \* \* \*